Dec. 27, 1966    G. W. LISKEY    3,294,367
VEHICLE SUPPORTING RACK
Filed Jan. 9, 1963    4 Sheets-Sheet 1

INVENTOR
GEORGE W. LISKEY
BY *Hans G. Hofmeister*
ATTORNEY

Dec. 27, 1966   G. W. LISKEY   3,294,367
VEHICLE SUPPORTING RACK
Filed Jan. 9, 1963   4 Sheets-Sheet 2

INVENTOR
GEORGE W. LISKEY
BY *Hans G. Hoffmeister*
ATTORNEY

United States Patent Office 3,294,367
Patented Dec. 27, 1966

3,294,367
VEHICLE SUPPORTING RACK
George W. Liskey, Okemos, Mich., assignor to FMC Corporation, San Jose, Calif., a corporation of Delaware
Filed Jan. 9, 1963, Ser. No. 250,266
23 Claims. (Cl. 254—88)

The present invention pertains to a vehicle supporting rack for use in servicing vehicles such as automobiles and trucks and more particularly to an economical and compact rack that is adjustable for various tread widths and that automatically moves between a dependably supported, level elevated working position and an inclined loading and unloading position in response to movement of a vehicle thereon.

The subject invention is primarily concerned with a teeter-type vehicle supporting rack, as contrasted with either a fluid-operated lift rack or a stationary rack having on-off ramps. As is known, a teeter rack has runways that are mounted on a central fulcrum and are movable up and down about the fulcrum between inclined and level elevated positions when a vehicle drives on or off the runways. Thus, no hydraulic or air lifts and associated fluid system are required, and the construction and operation are otherwise more simplified than a lift-type rack. The main advantage of a teeter rack is its economy.

Although teeter racks as broadly outlined above have long been known, they have not generally been commercially acceptable. One reason why certain conventional teeter racks have not been satisfactory, and would not be for modern use, is their transverse rigidity, allowing no transverse adjustment for various tread widths. As is believed understood, the tread width is the dimension, measured transversely of an automobile, for example, between transversely confronting wheels of the automobile. Of course, with the widely varying tread widths of modern cars, any rack must be capable of such adjustment if it is to be commercially acceptable. The rack of the present invention overcomes this disadvantage, as well as other disadvantages, of prior teeter racks.

Accordingly, an object of the present invention is to provide an economical, compact and simple vehicle supporting rack.

Another object is to provide a transversely adjustable teeter rack for accommodating vehicles of various tread widths.

Another object is to provide a rack with a runway that is mounted for teetering movement about a substantially horizontal axis and also for transverse movement along said axis.

Another object is to provide a rack, having a runway that is mounted for both lateral and teetering movement, with a brake for resisting said lateral movement while permitting said teetering movement.

Another object is to provide a rack including a runway that is skewable about an upstanding axis into and out of a predetermined position and that can be forced into and locked in said predetermined position when desired.

Another object is to provide a rack that is automatically movable between a dependably supported level working position and an inclined loading and unloading position in response to movement of a vehicle thereon.

Another object is to provide a teeter-type rack in which movements of the rack between inclined and level positions are damped.

Another object is to provide a rack having a safety guard that is automatically moved out of its guarding position and into a latching position upon movement of the vehicle lengthwise on the rack.

Another object is to provide a teetering rack with a unitary safety leg and rear wheel stop that pivot about a common axis.

Another object is to provide a teetering runway with dashpots, for damping teetering movement of the runway, that engage the floor on which the runway is supported but are not anchored to the floor.

Another object is to provide a teeter rack that is installed or relocated with a minimum of effort and time.

Another object is to provide a teeter rack that accommodates automotive vehicles with so-called swing axles wherein the wheels are not parallel to a vertical plane longitudinally bisecting the vehicle.

These, together with other objects, will become more fully apparent upon reference to the following description and accompanying drawings, in which.

Figure 1:
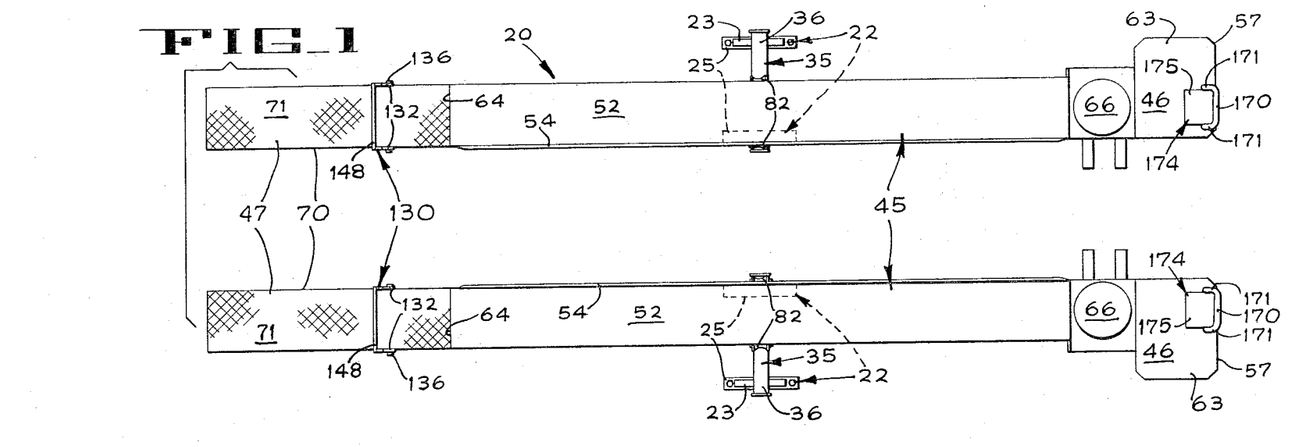
FIGURE 1 is a plan of a vehicle supporting rack embodying the principles of the present invention.
Figure 3:
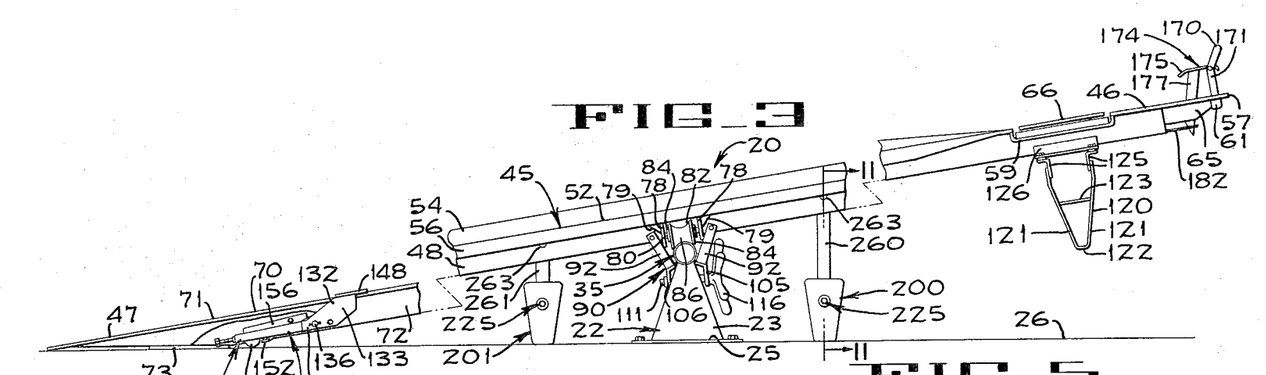
FIGURE 3 is an enlarged side elevation of the rack shown in FIGURE 1 but with intermediate portions being omitted and with other portions being broken away for illustrative clarity.
Figure 4:
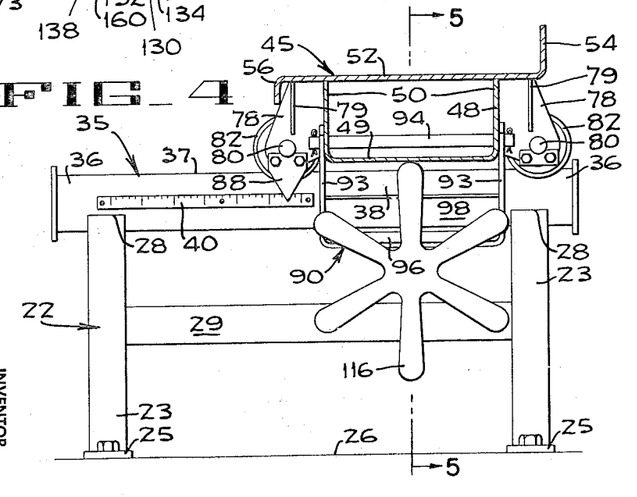
FIGURE 4 is an enlarged transverse vertical section taken on a plane indicated by line 4—4 in FIGURE 2 but showing only a single runway, and associated structure, of the rack.

A vehicle supporting rack embodying the present invention is generally identified by the numeral 20 in FIGURE 1. The rack includes a pair of transversely spaced pedestals 22 (FIGS. 1, 3 and 4). Each pedestal has inner and outer triangular brackets 23 providing base flanges 25 bolted to a floor 26, the only attachment of the rack to the floor, and upper apices 28. A cross brace 29 (FIGS. 4 and 5) rigidly interconnects the inner and outer brackets of each pedestal.

Figure 5:
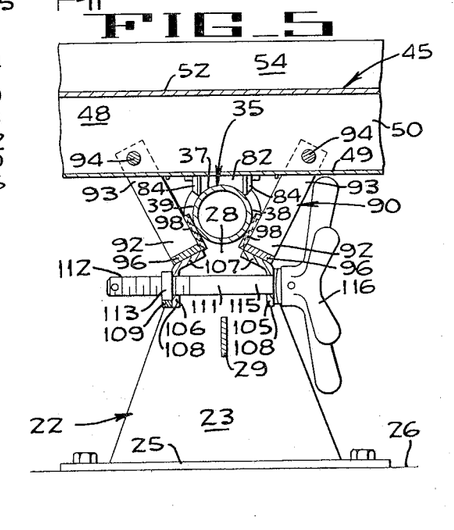
FIGURE 5 is a fragmentary longitudinal vertical section taken on line 5—5 in FIGURE 4.

Cylindrical rails or fulcrums 35 have opposite end portions 36 individually supported in the apices 28 of each pair of pedestals so that the rails are horizontal. The brackets are all of the same height, and the pedestals are located on the floor so that the rails are in axial alignment. For purpose of subsequent reference, it is to be noted that each rail has an upwardly facing convex surface 37 and generally front and rear surfaces 38 and 39 (FIG. 5). Scale plates 40 (FIG. 4), for indicating tread width, are fastened on the front surfaces of the rails.

The subject rack 20 also includes a pair of runways 45 (FIGS. 1, 3, 4 and 8) individually extending transversely of and over the rails 35. Each runway has a front end portion 46 and a rear end portion 47 and includes a channel 48 (FIG. 4) extending substantially the full length of the runway. The channel has a lower flange 49 and a pair of side flanges 50 projecting upward from the lower flange.

The side flanges 50 of each channel 48 have upper edges to which is secured a wheel plate 52 (FIG. 4) having an inner upwardly projecting flange 54 and an outer downwardly projecting flange 56. Furthermore, each wheel plate has a front edge 57 (FIG. 8), a depressed saddle portion 59 in adjacent rearwardly spaced relation to said front edge, a longitudinal slot 60 between the saddle portion and the front edge, a pair of pendent sockets 61 on opposite sides of the slot, a step portion 63 (FIG. 1) projecting outward adjacent to the front edge, and a rear edge 64. Ribs 65 (FIG. 2) reinforce the front end portions 46 of the runways. Turntables 66 are mounted in the saddle portions 59 of the runways 45 for a well known purpose.

Figure 7:
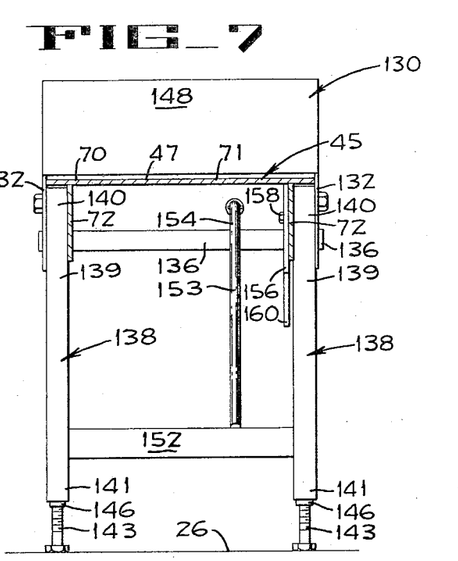
FIGURE 7 is an enlarged transverse vertical section taken on lines 7—7 in FIGURE 2 but showing only one of the runways, and associated structure, of the rack.
Figure 8:
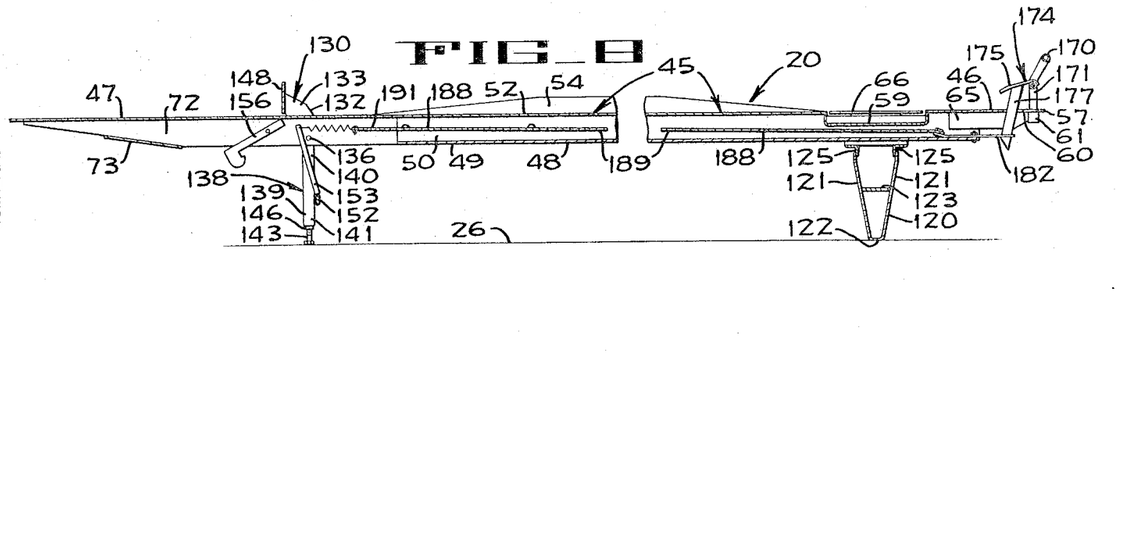
FIGURE 8 is a longitudinal vertical section through one of the runways of the subject rack with an intermediate portion being omitted for illustrative convenience and particularly showing a safety guard in guarding position and the structure connecting the guard to a guard control member on the runway.

Each runway 45 also includes a rear extension 70 (FIGS. 7 and 8) including a wheel plate 71 abutting the rear edge 64, side flanges 72 secured to the wheel plate 71 and projecting forward in overlapping relation to the side flanges 50 and bolted thereto, and a lower flange 73 interconnecting the side flanges 72 in rearwardly spaced relation to the channel 48.

In order to mount the runways 45 on the pedestals 22, pairs of roller brackets 78 (FIG. 3) are secured to and project outward from opposite sides of each runway 45 intermediate the end portions 46 and 47 thereof. Each pair of brackets includes a front bracket and a rear bracket, the front brackets being in a common front plane and the rear brackets being in a common rear plane parallel to the front plane. As best seen in FIGS. 3 and 4, each pair of brackets is secured to the wheel plate 52 and a side flange 50 of its runway, and webs 79 interconnect each bracket and adjacent wheel plate for reinforcing purposes. Shafts 80 are securely mounted in the brackets in parallel relation to the runways, and rollers 82 are individually journalled and axially movable on the shafts. Thus, each runway has two rollers, one on each side thereof. Each roller has opposite ends 84 respectively spaced from and engageable with the adjacent brackets 78 thereby to allow limited axial movement of each roller on its respective shaft. Furthermore, each roller has a concave surface of revolution 86 complementarily engaging its adjacent rail for rolling movement therealong and sliding movement therearound. Internally, these rollers are of the same construction as that specifically disclosed in the copending U.S. application of Melvin H. Lill, Ser. No. 132,473, filed August 18, 1961, now Patent No. 3,190,395. Pointers 88 (FIG. 4) are mounted on the front outer brackets 78 in overlying relation to the tread width scale plates 40.

From the description so far, it should be understood that the runways 45 (FIGS. 1 and 2) are independently mounted on the rails 35 for teetering movement about a substantially horizontal axis, that is the common axis of the rails, during which movement the rollers 82 slide circumferentially of the rails, and also for transverse or lateral movement along the rails, that is along the axis of the rails, during which movement the rollers roll on the rails. Still further, each runway is skewable about an upstanding axis intersecting the axis of its respective rail so that the runway can be moved into and out of precisely perpendicular relation with the axis of the rail; this skewing movement is permitted since, as described, the rollers are axially movable on their respective shafts 80.

A significant feature of the present invention is that the transverse and skewing movement of the runways 45 can be prevented without interfering with the teetering movement. Thus, each runway is provided with a brake 90, best illustrated in FIGS. 4 and 5. Each brake includes front and rear yokes 92 (FIG. 5) respectively positioned forward and rearward of the rollers 82. Each yoke has a pair of transversely spaced arms 93, pivotally connected by pins 94 to the side flanges 50 of the channel 48, and straps 96 interconnecting the arms. The pivot pins for the arms are substantially horizontal and are disposed perpendicularly to the runways. Each brake also has brake shoes 98 individually mounted on the straps in confronting relation to the front and rear surfaces 38 and 39 of the rails 35 and in perpendicular relation to the runways. By swinging the yokes forwardly and rearwardly, the shoes are moved toward and away from the rails into and out of a braking position wherein the shoes tangentially engage the rails.

In order to control the movement of the yokes 92, and thus the brake shoes 98, each brake 90 also includes front and rear angle brackets 105 and 106 (FIG. 5) having connecting tabs 107 rigidly secured to the straps 96 of the front and rear yokes, respectively, and pendent tabs 108 projecting downward from the connecting tabs. A nut stop 109 is secured to the rear surface of the pendent tab on the rear bracket, and a bolt 111 is loosely extended through the pendent tabs. The bolt has a rear threaded portion 112 on which is threaded a nut 113 and a front portion 115 on which is secured a handwheel 116. With the nut against the rear pendent tab and engaging the nut stop, rotation of the hand wheel threads the bolt through the nut and thus moves the front and rear yokes between a braking position wherein the brake shoes frictionally grasp their respective rail and a released position wherein the pressure of engagement of the shoes against the rail is relieved.

It is important to note that when the brake shoes 98 are moved into their braking positions, engagement of the shoes with their associated rail 35 (FIGS. 4 and 5) moves the respective runway 45 into precisely perpendicular relation to the rail. This positive positioning occurs since the brake shoes are perpendicular to the runway and engage the rail on opposite sides and lengthwise thereof. Moreover, this perpendicular relationship between each runway and its rail is maintained as long as the brake shoes are held in their braking positions by their bolt 111 and nut 113 together with their brackets 105 and 106.

It is also important that when the brake shoes 98 are in braking positions, they resist, and for practical purposes preclude, lateral movement of the runways 45 along the rails 35 while permitting teetering movement of the runways circumferentially of the rails. That is, the lateral thrusts imposed on the runways with respect to the rails are insufficient to overcome the frictional grasp of the rails by the shoes. However, the brake shoes as well as the rollers 82 are capable of sliding circumferentially of the rails and, upon application of sufficient vertical force either forward or rearward of the rails, the runways teeter or rock about the axis of the rails.

Figure 2:
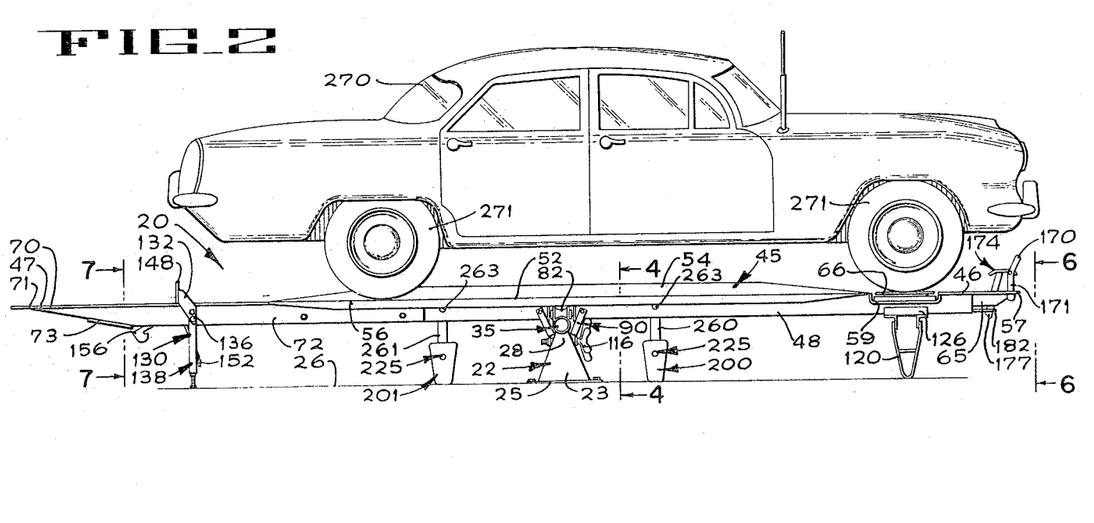
FIGURE 2 is a side elevation of the rack shown in FIGURE 1 with the rack being illustrated in a level working position and with a vehicle being supported on the rack.
Figure 6:
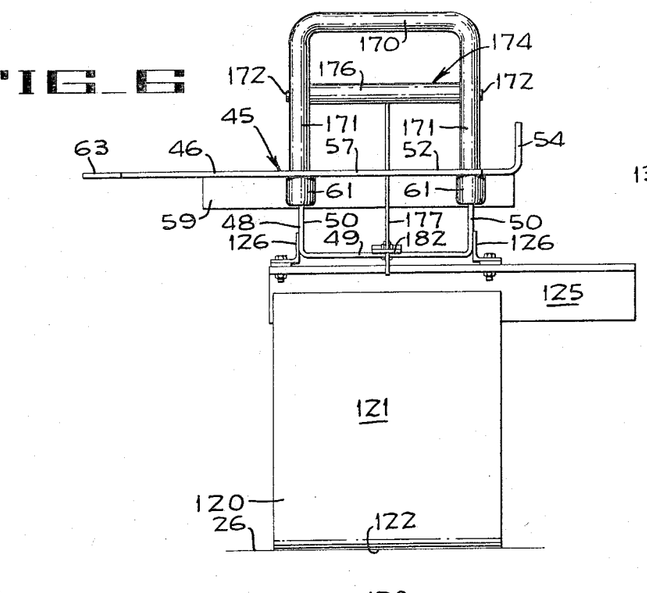
FIGURE 6 is an enlarged end elevation taken from a position represented by lines 6—6 in FIGURE 2 but showing only one of the runways, and associated structure, of the rack.

Teetering movement of the runways 45 is limited in a horizontal or level position of the runways by V-shaped front legs 120 (FIG. 3) depending from the front end portions 46 of the runways. Each leg includes front and rear panels 121 diverging upward from a base portion 122, having an outer convex floor engaging surface, and being interconnected by a strut 123. Front and rear brackets 125 (FIGS. 3 and 6) are secured to the panels and extend cross-wise of their respective runway under the lower flange 49 of the channel 48. Side brackets 126 are mounted on and extend lengthwise of the side flanges 50 and are bolted to the front and rear brackets of the legs. Thus, when the runways teeter in a clockwise direction, as viewed in FIGURE 3, from an inclined position, the base portions of the legs 120 strike the floor 26 and limit movement of the runways in this direction to a substantially horizontal or level elevated position as shown in FIGURE 2.

To provide additional support for the runways 45 in their elevated positions, rear safety guards 130 (FIGS. 3, 7, 8 and 9) are mounted on the rear end portions 47 of the runways. Each guard has a pair of mounting plates 132 (FIG. 3) with each plate providing a projecting portion 133 and an opposite connecting portion 134. The mounting plates for each guard are pivoted to the side flanges 72 of the runway extension 70 on a shaft 136. Each guard also provides a pair of transversely spaced rear legs 138, each leg including a shank 139 having an upper end 140 bolted to the connecting portion 134 of one of the mounting plates, a lower end 141, and a height adjusting bolt 143 threaded into the lower end of its shank. A jam nut 146 is threaded on the adjusting bolt for engagement with the lower end of the shank thereby to enable selective positioning of the adjusting bolt. The legs are located against the outer surfaces of the side flanges 72 for slidable movement thereagainst. In addition, each safety guard has a rear wheel stop 148 (FIGS. 7 and 8) rigidly interconnecting the projecting portions 133 of the mounting plates and extending transversely of and over the wheel plate 71 of the runway. Each safety guard, including the unitary wheel stop and legs, is thus mounted for pivotal movement from a guarding position (FIG. 8) with the rear legs projecting downward and the wheel stop 148 projecting upward from the runway in substantially perpendicular relation thereto, to an intermediate retracted position (FIG. 9) with the rear legs extending lengthwise of the runway and the wheel stop in acute angular relation to the wheel plate 71, and to a fully retracted position (FIG. 3) also with the legs lengthwise of the runway but with the wheel stop flush against the upper surface of the wheel plate.

In order to latch each safety guard 130 in its intermediate retracted position, a latch bar 152 (FIG. 7) rigidly interconnects each pair of rear legs 138, and a connecting rod 153 is secured to the latch bar and has an upper end 154 (FIG. 9) extending rearward and above the pivot shaft 136 for the guard. A latch 156 has an upper end 157 pivoted by a pin 158, which is parallel to the pivot shaft 136, on one of the side flanges 72. The latch also has a lower end 160 providing a hook 161 that defines a U-shaped notch 162.

Figure 9:
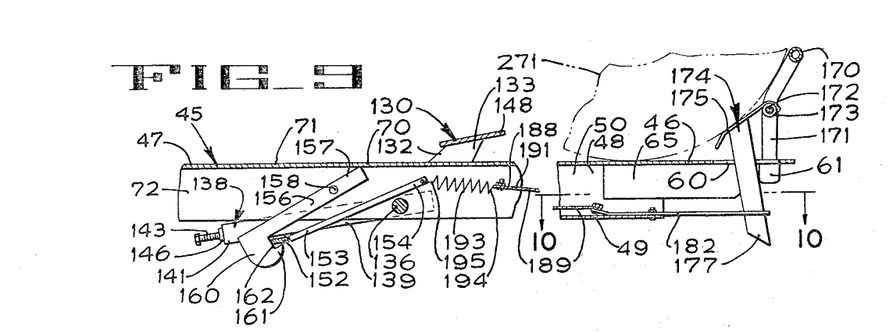
FIGURE 9 is a fragmentary longitudinal vertical section of one of the runways with even more of the central portion of the runway being omitted than in FIGURE 8 and particularly showing the safety guard in a latched position wherein it is moved by engagement of a vehicle wheel, partially illustrated by phantom lines, with the guard control member.

When either runway 45 is in its elevated position and its safety guard 130 is in its guarding position (FIG. 8), its latch 156 is maintained in rearwardly declined position by engagement of the upper end 157 of the latch with its respective wheel plate 71; in this position of the latch, the distance between the pivot shaft 136 and the lower edge of the latch bar 152 is slightly greater than the distance between the pivot shaft and the hook 161. Therefore, when the safety guard is moved toward its intermediate retracted position, the latch bar strikes the hook and carries the latch upwardly with the guard until the latch bar moves past the hook, thereby allowing the latch to drop and capture the bar in the notch whereupon the guard is latched in its intermediate retracted position (FIG. 9).

When either runway 45 moves into its inclined loading and unloading position (FIG. 3), the lower end 160 of its latch 156 engages the floor 26 and moves upward about its pin 158 whereby the hook 161 moves rearward of the latch bar 152 and releases the bar from the notch 162 before the bolts 143 strike the floor. Thus, when the rear end portion 47 of the runway again moves upwardly, the guard gravitates into guarding position.

Another noteworthy feature is that the subject rack 20 provides for automatic movement of the guards 130 into retracted positions. In this regard, a front wheel stop 170 (FIG. 8) includes a pair of prongs 171 releasably downwardly fitted in the sockets 61 of each runway 45. A horizontal pin 172 is extended through the prongs and hingedly mounts a guard control member 174 thereon. The guard control member includes a treadle 175 having an arcuate hinge portion 176 rotatably fitted on the pin 172, and a lever 177 rigidly connected to the treadle and projecting downward therefrom through the slot 60 in the runway.

Figures 10, 12:
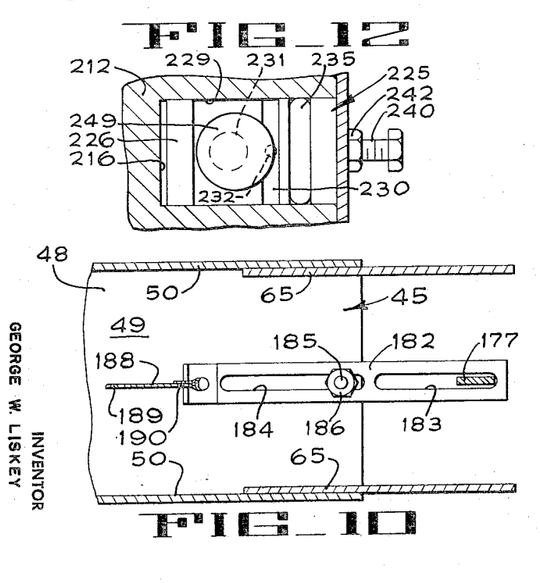
FIGURE 10 is an enlarged fragmentary horizontal section taken on a plane at a position indicated by line 10—10 in FIGURE 9.
FIGURE 12 is an enlarged horizontal section taken on a plane at a position indicated by line 12—12 in FIG. 11.

A slide plate 182 (FIGS. 8, 9 and 10) having a front slot 183 and a rear slot 184 therein is slidably mounted on the lower flange 49 of the channel 48 of each runway 45 by a bolt 185 projecting upward through the lower flange and the rear slot 184, and a nut 186 threaded on the bolt. Further, the lever 177 projects through the front slot 183 in the slide plate. A tension member 188 (FIG. 8) includes a relatively non-extensible cable 189 having a front end 190 connected to the slide plate and a rear end 191. The tension member also includes a tension spring 193 having a front end 194 connected to the rear end of the cable and a rear end 195 connected to the upper end 154 of the connecting rod 153. Assuming that the rear safety guard 130 of one of the runways is in its guarding position (FIG. 8), when the treadle 175 is moved downward, that is in a counterclockwise direction around the pin 172, the slide plate 182 and the tension member 188 are moved forwardly thereby to pull forwardly on the upper end of the connecting rod 153 whereby the guard is moved in a clockwise direction about the shaft 136 into its intermediate retracted, or latching, position, as above described.

In order to damp or cushion teetering movement of the runways 45, front and rear dashpots 200 and 201 (FIGS. 2 and 3) are connected to each runway in forwardly and rearwardly spaced relation to the rails 35. Each dashpot (FIG. 11) includes a housing or cylinder 203 having a frusto-conical side wall 204, a top wall 205 providing a central bore 206 and an annular groove 207 circumscribing the bore, and a bottom wall 208. An O-ring 209 is fitted in the groove. It is significant that the bottom walls of the dashpots abut but are not connected to the floor 26.

Figure 11:
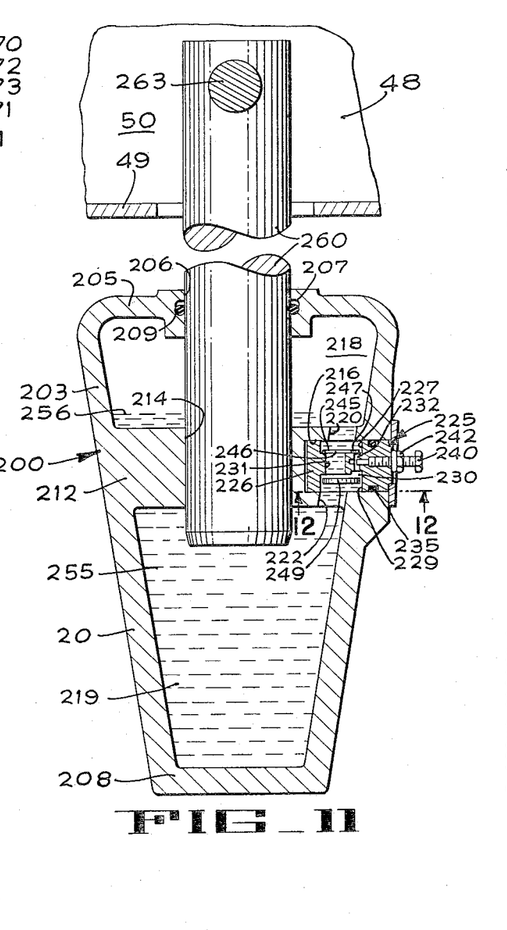
FIGURE 11 is an enlarged fragmentary vertical section taken on line 11—11 in FIGURE 3 and with a portion thereof being omitted for illustrative convenience.

Further, each dashpot 200 or 201 has a partition 212 that is connected to the side wall 204 of the housing 203. The partition has an axial bore 214, coaxial with the top bore 206, and a radial bore 216 opening laterally outward of the housing. The partition divides the housing into an upper auxiliary chamber 218 and a lower pressure chamber 219, and the partition provides upper and lower ports 220 and 222 respectively opening from the radial bore into the upper and lower chambers.

In each dashpot 200 or 201 a checkvalve 225 includes a cylindrical block 226 slidably fitted in the radial bore 216. The block provides a rectangular upper cavity 227 under and registering with the upper port 220, a rectangular lower recess 229 over and registering with the lower port 222, a slot 230 (FIGS. 11 and 12) upwardly extended from the recess, a cylindrical main passage 231 (FIG. 11), and a restricted hole 232 communicating with the slot 230; both the passage and the hole interconnect the upper cavity and the lower recess. An O-ring 235 is fitted in an annular groove in the block and is in sealing engagement with the housing and the block.

A needle valve 240 (FIG. 11) projects radially of each dashpot housing 200 or 201 through the block 226 into the restricted hole 232 and is radially adjustable into and out of the hole between a position completely blocking the passage of liquid through the hole and selected positions spaced outward from the blocking position for allowing restricted or free passage of liquid through the hole. A lock nut 242 secures the needle valve in selected positions of adjustment. An upper rectangular plate 245 is fitted in the upper cavity for free floating movement therein. This upper plate has an aperture 246 registerable with the main passage 231 and an imperforate portion 247 located above and positionable over the restricted hole 232. A lower circular disc 249 is positioned within the lower rectangular recess 229 for free floating movement therein between an upper position over the main passage 231, so as to block flow of liquid from the lower recess into the main passage, and a lower position wherein it is supported on the cylindrical wall of the radial bore 216 in spaced relation above the lower port 222, the latter position being illustrated in FIG. 11. In the upper position of the lower disc, liquid is permitted to move around the disc (FIG. 12), through the slot 230 and into the restricted hole.

Liquid 255, such as oil, fills the lower chamber 219 and, in the upper chamber 218, has an upper surface 256 slightly above the partition 212. Thus, liquid also fills the lower port 222, the recess 229, the slot 230, the passage 231, the hole 332, the cavity 227, and the upper port 220.

The front and rear dashpots 200 and 201 of each runway 45 have front and rear plungers 260 and 261, respectively, with the front plunger being longer than the rear plunger. The plungers are connected to their respective runways 45 by horizontal pins 263 extending transversely of the runway through the side flanges 50 of the channel 48, it being noted in FIG. 11 that the plungers extend upward through the lower flange 49 of this channel. The plungers have lower portions individually downwardly slidably fitted through the top bores 206 and the axial bores 214 into the lower chambers 219 of the housings 203.

When each runway 45 teeters from its inclined position (FIG. 3) into its elevated position (FIG. 2), the front dashpot 200 damps the teetering movement. Thus, as the forward end portion 46 of the runway moves downward, and with reference to FIG. 11, the plunger 260 is forced downward into the lower chamber 219 forcing liquid through the lower port 222 into the lower recess 229. The pressure of the liquid forces the disc 249 over the main passage 231 blocking flow of liquid upward through the main passage. Since the only path for liquid is now through the restricted hole 232, movement of the plunger in the lower chamber is greatly resisted whereby the runway is eased into a level position. The same easing action is effected by the rear dashpot 201 when each runway tilts into inclined position. By adjusting the needle valve 240, the amount of cushioning or damping, and thus the speed of movement of the runway, is adjusted. Furthermore, as the runway teeters into elevated position, the rear plunger 261 (FIG. 3) is pulled upward out of the rear lower chamber 219 (FIG. 11), the weight of the rear dashpot keeping its bottom wall on the floor 26. This allows liquid to flow from the rear upper chamber 218 through the upper port 220 and into the upper cavity 227, through the aperture 246 in the upper plate 245, and through the main passage 231 into the lower recess 229, it being noted that the lower disc 249 moves into its lower position, as shown in FIG. 11, since the pressure of the liquid in the lower chamber is relieved by the upward movement of the plunger. Thus, the checkvalve 225 does not impede movement of the liquid from the upper chamber into the lower chamber, so that the rear plunger moves freely out of the lower chamber upon movement from inclined to elevated positions and so that the front plunger moves freely upwardly upon movement from elevated to inclined positions. In each situation, the dashpots remain in contact with the floor although not fastened thereto.

Assuming that it is desired to use the subject vehicle supporting rack 20 for supporting an automobile 270, having wheels 271, for wheel alignment, the runway brakes 90 are released and the runways 45 are adjusted transversely on the rails 35, as indicated by the scales 40 and pointers 88, so that the transverse distance between the runways corresponds to the tread width of the automobile. The runway brakes 90 are then locked in braking positions to maintain the selected distance between the runways and to hold the runways in perpendicular relation to the rails.

The automobile 270 is then driven up the inclined runways 45 until its center of gravity is forward of the rails 35. As the runways begin to teeter toward elevated positions, the automobile brakes, not shown, are applied thereby preventing movement of the automobile on the runways. The runways and the automobile thus teeter into elevated position (FIG. 2) wherein teetering movement is stopped by engagement of the front legs 120 with the floor 26. Of course, the front dashpots 200 gently cushion the automobile into the level elevated position.

During the described action, and as the rear end portions 47 of the runways 45 lift off the floor 26, the bolts 143 of the rear safety guards 130 remain in contact with the floor since, as explained, the latch bars 152 are out of the notches 162. As the runways move toward level positions, the pivot shafts 136 of the safety guards are lifted relative to the bolts 143 whereby the guards gravitate toward their guarding positions. When the runways reach level positions, the guards swing into guarding positions, it being noted that the wheel stops engage the wheel plates 71 and prevent overtravel of the guards. It is also to be noted that when the runways are elevated the distance between the runways and the floor is sufficient to allow the rear legs to swing into guarding positions. Thus, the automobile 270 is quickly and safely raised to an elevated position wherein it is dependably supported by the runways and the front legs 120. If the center of gravity inadvertently shifts rearward of the rails 35, the rear legs 138 strike the floor and support the runways in elevated positions. Furthermore, the front rear wheel stops 170 and 148 preclude inadvertent travel of the automobile off from the rack 20.

With the automobile 270 supported in elevated position, the runway brakes 90 are released under both runways 45 and the automobile is moved transversely on the rails 35 until it is in a predetermined position for wheel alignment purposes. In this regard, it is to be noted that the rollers 82 roll on the rails whereas the front legs 120 slide across the floor 26. Of course, the axial movement of the rollers on their shafts 80 allows skewing of the runways so as to accommodate vehicle wheels, as 271, which are not precisely parallel to a vertical plane passing through the centerline of the vehicle. With these adjustments completed, wheel alignment checks can be made on the automobile, it being noted in FIG. 1 that there is an unobstructed work area between the runways.

When it is desired to remove the automobile 270 from the rack 20, the runway brakes 90 under both runways 45 are locked. The automobile is then driven forwardly beyond the turntables 66 until the front wheels 271 engage and depress the treadles 175 whereby the rear safety guards 130 are pulled into their latched, intermediate retracted positions. The springs 193 stretch only if the treadle is depressed beyond a predetermined amount by overtravel of the automobile and, in this manner, protect the guards and other parts from damage. The vehicle is next driven backwardly until its center of gravity is rearward of the rails 45 causing the runways to teeter toward inclined positions. The rear dashpots 201 ease the rear end portions 47 of the runways into engagement with the floor 26 while the front plungers 260 easily withdraw from the lower chambers 219 of the front dashpot housings 203. As the lower ends 160 of the latches 156 strike the floor, the rear safety guards 130 are released and are conditioned for movement into guarding positions the next time the runways are elevated. The automobile is driven entirely off the rack so that the rack is ready for the next vehicle.

From the foregoing, it will be understood that a transversely adjustable teeter-type, vehicle supporting rack has been provided. The rack of the subject invention offers the advantages of economy, compactness, and simplified operation while being adjustable for accommodating vehicles of various tread widths and vehicles with wheels in various angular positions. Further advantages are that the rack moves automatically between a dependably supported, elevated, level working position and an inclined loading and unloading position in response to movement of a vehicle thereon and that forward movement of the vehicle on the rack in working position releases the rear safety guards 130 and conditions the rack for movement into inclined position. Still further, the instant rack is easy to install or relocate since only the pedestals 22 are fastened to the floor, the dashpots 200 being capable of operating without attachment to the floor.

Although a preferred embodiment of the present invention has been shown and described, it is to be understood that various changes and modifications may be made in the details thereof without departing from the spirit and scope of the appended claims.

Having thus described the invention, what I claim as new and desire to secure by Letters Patent is:

1. In a vehicle supporting rack, a runway having opposite end portions, a relatively fixed axis member extending transversely of the runway, means mounting said runway intermediate its end portions on said axis member for movement on said axis member transversely of the runway and for teetering movement about an axis defined by said axis member, and friction means opposing and engageable with said axis member for releasably resisting said lateral movement of the runway while permitting said teetering movement thereof.

2. In a vehicle supporting rack, a rail mounted in an elevated substantially horizontal position, a runway extending transversely of and over said rail, said runway having opposite end portions, and means mounting the runway on the rail intermediate said end portions so that movement of a vehicle along the runway will cause the runway to teeter on the rail, said mounting means including a roller journalled on said runway for rolling on said rail upon movement of the runway lengthwise of the rail and for sliding movement on said rail upon said teetering of the runway.

3. The rack of claim 2 wherein said runway has opposite ends and wherein said rail and roller are located substantially centrally between said ends.

4. In a vehicle supporting rack, a substantially horizontal rail having an upwardly disposed convex surface of revolution; a runway extending transversely over said rail; a roller having a concave surface of revolution rollably engaging said surface of the rail for rolling movement therealong and for slidable movement circumferentially thereof; means journalling said roller on said runway for movement of the runway with said roller along said rail; and braking means mounted on said runway at opposite ends of said roller and releasably slidably grasping said rail in circumferentially spaced relation to said roller for holding said roller against rolling movement along said rail while permitting sliding movement of said roller circumferentially of said rail.

5. The rack of claim 4 wherein said runway has front and rear end portions, said rail being intermediate said end portions, wherein said braking means includes U-shaped yokes pivotally connected to said runway on axes disposed transversely thereof and depending therefrom in front and in back of said rail, brake shoes mounted on said yokes in confronting relation to said rail, and means interconnecting said yokes for pivoting them toward and away from each other thereby to move said shoes between a braking position tightly grasping said rail therebetween and a released position wherein said tight grasp is relieved.

6. The rack of claim 5 wherein said interconnecting means includes brackets depending from said yokes, a bolt passing through said brackets and having front and rear ends extending from said brackets, a handwheel connected to one end of the bolt, a nut threaded on the other end of the bolt, and a stop on the bracket receiving said other end for precluding rotation of said nut upon rotation of said bolt.

7. In a vehicle supporting rack, a substantially horizontal rail, a runway extending transversely over said rail, said runway having opposite sides, a pair of rollers, means journalling said rollers on opposite sides of said runway with their axes of rotation substantially parallel to each other and extended lengthwise of the runway, said rollers being in rollable engagement with said rail and said journalling means mounting said rollers for limited movement lengthwise with respect to said runway thereby to permit limited skewing of said runway out of a position precisely perpendicular to said rail, a pair of elongated brake shoes, means on said runway mounting said shoes on opposite sides of said rail and in perpendicular relation to said runway, said shoe mounting means also mounting said shoes for movement toward and away from said rail between a braking position engaging said rail wherein movement of said roller on said rail is resisted and wherein said runway is moved into and held in its perpendicular position with respect to said rail, and a released position allowing said roller to roll on said rail and skewing of said runway out of said perpendicular position, and means interconnecting said mounting means for moving said shoes toward and away from said rail.

8. In a vehicle supporting rack, a runway, means mounting said runway for elevational movement about a substantially horizontal axis extending transversely of the runway between an elevated substantially horizontal working position and an inclined loading and unloading position, and a safety guard pivotally connected to the runway for movement about an axis substantially parallel to said horizontal axis between an upright guarding position projecting from said runway and a retracted position extending lengthwise of the runway, said guard being yieldably urged into its guarding position, means for latching said guard in its retracted position, and means mounted on and projecting from said runway and being connected to said guard for pivoting it into latching engagement with said latching means.

9. The rack of claim 8 wherein said guard includes a wheel stop and a leg that respectively project up and down from said runway in said guarding position.

10. In a vehicle supporting rack, a runway mounted for elevational movement about a substantially horizontal axis between a substantially horizontal working position and an inclined loading and unloading position and adapted to support a vehicle for travel lengthwise thereof, a safety guard pivotally connected to said runway for movement about an axis in spaced parallel relation to said horizontal axis between an upright guarding position projecting from said runway and a retracted position extending lengthwise of the runway, said guard being yieldably urged into its guarding position, latch means for latching the guard in its retracted position, a guard control member movably mounted on said runway in the path of travel of a vehicle for movement when engaged by said vehicle, and means interconnecting said guard control member and said guard for pivoting said guard into latching engagement with said latch means in response to movement of said guard control member.

11. The vehicle supporting rack of claim 10 wherein said interconnecting means includes a plate mounted on said runway for slidable movement lengthwise thereof and a tension member interconnecting said plate and said guard; and wherein said control member includes a treadle mounted on said runway in the path of travel of a vehicle wheel thereon and movable about a pivot axis substantially parallel to said horizontal axis, and wherein said control member also includes a lever rigidly connected to and downwardly extended from said treadle and connected to said plate for tensioning said tension member when a vehicle wheel depresses said treadle thereby to swing said guard into latching engagement with said latch means.

12. The supporting rack of claim 11 wherein said tension member includes a relatively non-extensible cable and a tension spring connected in end-to-end relation and to said plate and guard respectively.

13. In a vehicle supporting rack, a runway, means centrally pivoting said runway for teetering movement about a substantially horizontal axis extending transversely of the runway between an elevated substantially horizontal working position and an inclined loading and unloading position, a safety guard including a wheel stop and a leg, said stop and leg being rigidly interconnected and projecting in opposite directions from a common pivot axis parallel to said horizontal axis, and means mounting the guard on the runway for pivotable movement on said common pivot axis between a guarding position with said stop and leg respectively projecting up and down from said runway and a retracted position with said leg and stop extending lengthwise of said runway 14. The combination of a support surface, a fulcrum member mounted on said surface and upstanding therefrom; a vehicle runway having opposite end portions; means mounting said runway on said fulcrum member intermediate said end portions for teetering movement of said end portions toward and away from said surfaces and for movement of said runway along a path extended transversely of said runway; and a dashpot for cushioning said teetering movement including a housing rested on and freely slidable on said surface under one end portion of said runway, a plunger connected to said one end portion and fitted in said housing for reciprocable movement into and out of said housing upon teetering of said runway, and means in said housing yieldably resisting movement of said plunger into said housing but permitting substantially unrestricted movement of said plunger out of said housing.

15. The rack of claim 14 wherein said housing has a pressure chamber and an auxiliary chamber, said plunger moving into and out of said pressure chamber as said plunger moves into and out of said housing respectively; and wherein said resisting means includes liquid filling said pressure chamber, and check valve means interconnecting said chambers for allowing restricted flow of liquid from said pressure chamber through said valve means into said auxiliary chamber upon movement of said plunger into said pressure chamber and for allowing relatively unrestricted flow of liquid from said auxiliary chamber back into said pressure chamber upon movement of said plunger out of said pressure chamber.

16. A vehicle supporting rack comprising elongated runway means having front and rear end portions; means releasably secured to the floor supporting said runway means intermediate its end portions for teetering movement of said runway means about a horizontal axis between an elevated level position and an inclined position, said supporting means including means for allowing transverse movement of said runway means along said axis, said runway supporting means further including means for allowing skewing movement of said runway means about an axis perpendicular to said runway means and to said horizontal axis, said transverse movement and said skewing movement resulting in horizontal motion of the ends of said runway means; means on said runway means engageable with said supporting means for precluding said transverse and skewing movements while permitting said teetering movement and for positioning said runway means perpendicular to said horizontal axis; dashpot means connected to said end portions and dependent therefrom for yieldably resisting movement of their associated end portions toward said floor but permitting substantially unrestricted movement of their end portions away from said floor, said dashpot means being provided with a surface freely slidable on said floor as the ends of said runway means move horizontally; front leg means extending downward from said front end portion of the runway means; guard means pivotally mounted on said rear end portion for movement between a guarding position projecting upward and downward from said rear end portion and a retracted position extending lengthwise of said runway means; latch means pivoted on said rear end portion for holding said guard means in retracted position when the runway means is in level position and for releasing said guard means upon engagement with the floor when the runway means is in inclined position; guard control means projecting up from said front end portion of the runway means and adapted to be contacted by a vehicle moving forward on the rack; and means extending lengthwise of said runway means and interconnecting said guard control means and said guard means for moving said guard means into latching engagement with said latch means when a vehicle contacts said control means.

17. The combination of claim 14 wherein said housing is freely separable from said surface.

18. The rack of claim 2 including brake means on said runway for releasably grasping said rail so as to resist said lengthwise movement of the runway while permitting said teetering thereof.

19. In a vehicle supporting rack adapted to support a vehicle having wheels whose normal positions are not parallel to a vertical plane containing the center line of the vehicle; an elevated support member; runways extending over said member; and mounting means connected to said runways and engaging said support member for teetering of said runways about a horizontal axis, said mounting means also engaging said support member for movement of said runways lengthwise of said axis, said mounting means including means for independently skewing each of said runways about independent upstanding axes intersecting said horizontal axis so as to accommodate said non-parallel wheels.

20. In a vehicle supporting rack according to claim 19 wherein there is further included means for resisting said lengthwise movement and said skewing, and for positioning said runways perpendicular to said horizontal axis while permitting said teetering.

21. In a vehicle supporting rack according to claim 19 wherein said support member is adapted to be supported on a floor, and each of said runways includes a leg depending therefrom in spaced relation to said support for abutting said floor to limit teetering of the associated runway and to support the associated runway in a level position, said legs slidably engaging said floor for sliding movement thereover during said lengthwise movement and skewing of said runways.

22. In a vehicle supporting rack adapted to support a vehicle having wheels whose normal positions are not parallel to a vertical plane containing the center line of the vehicle, a pair of runways, each of said runways having opposite end portions; and means connected to each of said runways supporting said runways intermediate their end portions for teetering movement about a common axis, said means including means for skewing each of said runways independently of each other about generally upstanding axes passing through the respective runways so as to accommodate said non-parallel wheels.

23. The rack of claim 1 including adjustable means for actuating said friction means.

References Cited by the Examiner
UNITED STATES PATENTS

| | | | |
|---|---|---|---|
| 745,545 | 12/1903 | Webb | 254—88 |
| 808,208 | 12/1905 | Maxwell | 254—88 |
| 1,263,954 | 4/1918 | Sallender | 254—88 |
| 1,280,727 | 10/1918 | Hem | 188—96 |
| 1,477,332 | 12/1923 | Elzey | 254—88 |
| 1,527,901 | 2/1925 | Munday | 254—88 |
| 1,820,267 | 8/1931 | Box | 254—88 |
| 1,821,787 | 9/1931 | Black. | |
| 1,861,270 | 5/1932 | Hallead et al. | 188—96 |

FOREIGN PATENTS

| | | |
|---|---|---|
| 517,929 | 2/1940 | Great Britain. |

WILLIAM FELDMAN, *Primary Examiner.*

MILTON S. MEHR, O. M. SIMPSON, *Examiners.*